UNITED STATES PATENT OFFICE.

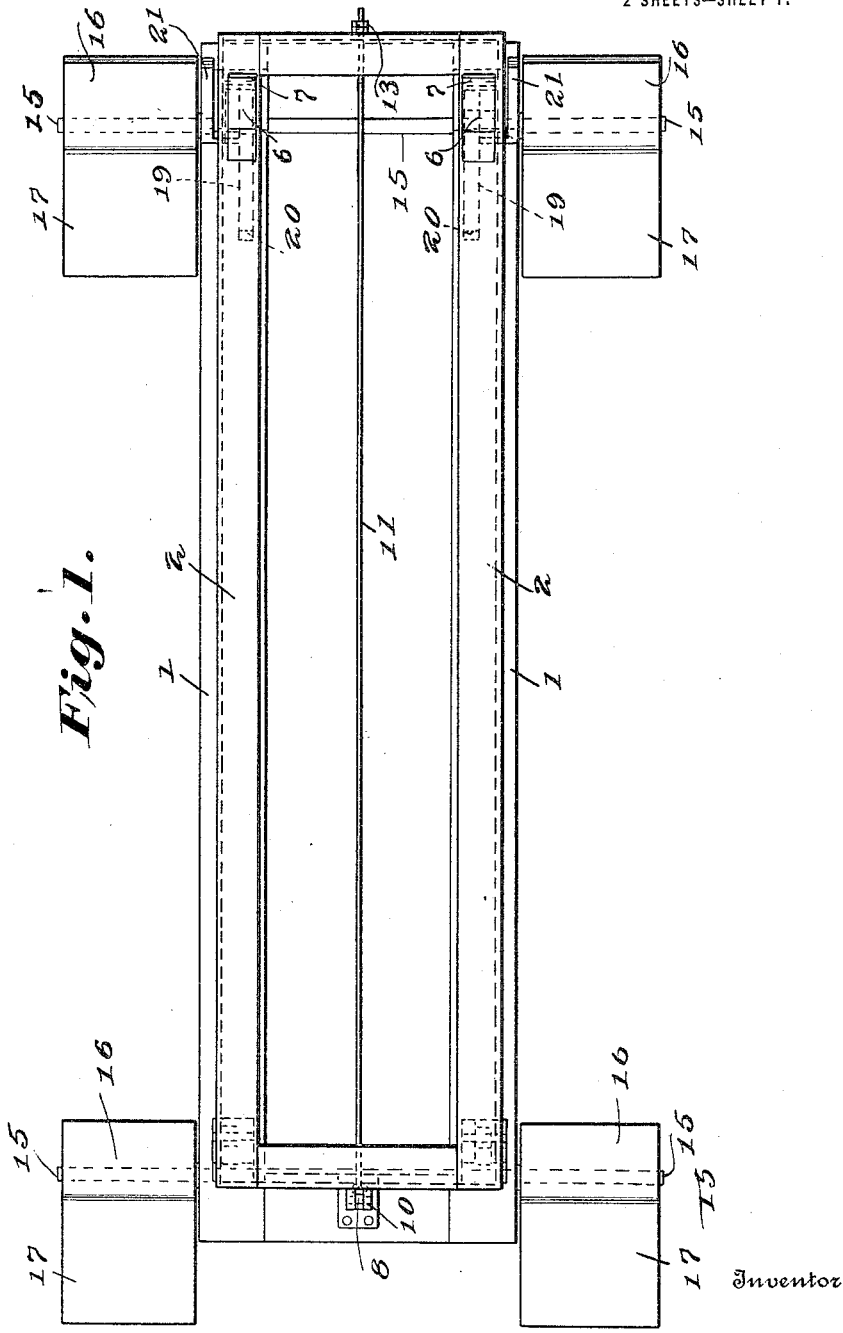

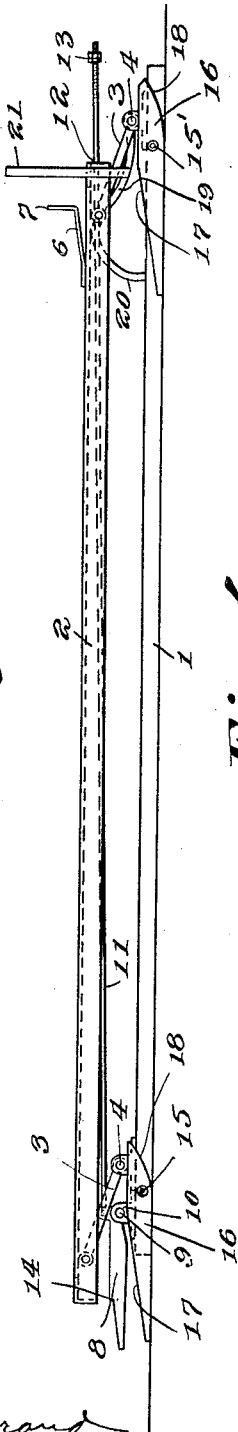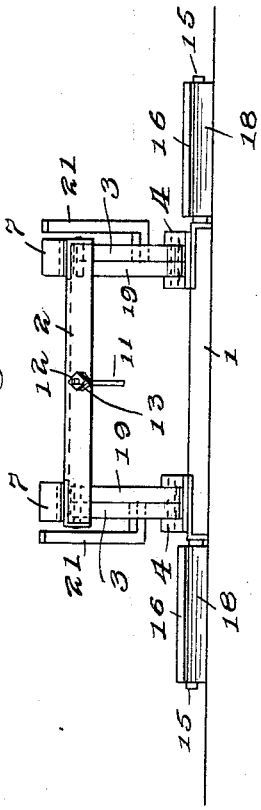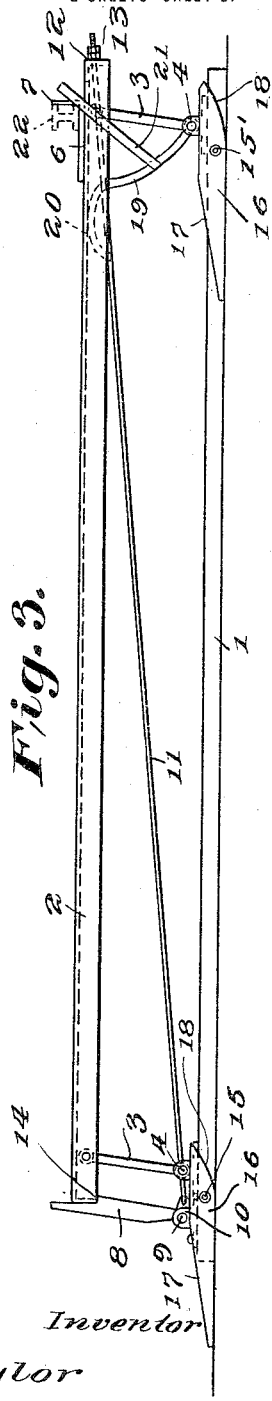

WILLIAM J. TAYLOR, OF BOISE, IDAHO.

AUTOMATIC AUTOMOBILE-LIFTER.

1,205,815.

Specification of Letters Patent.

Patented Nov. 21, 1916.

Application filed July 19, 1916. Serial No. 110,152.

*To all whom it may concern:*

Be it known that I, WILLIAM J. TAYLOR, a citizen of the United States, residing at Boise, in the county of Ada and State of Idaho, have invented new and useful Improvements in Automatic Automobile-Lifters, of which the following is a specification.

This invention relates to automatic automobile lifters, the object in view being to provide a device of the class referred to embodying in connection with a suitable supporting base, a vehicle supporting frame adapted to move upwardly and downwardly in relation thereto, combined with means whereby an automobile or similar vehicle in being propelled over the lifter serves to elevate said vehicle supporting frame until the wheels of the vehicle are clear of the ground or floor, means being provided for locking the vehicle supporting frame in its raised position.

With the above and other objects in view, the invention consists in the novel construction, combination and arrangement of parts, as herein described, illustrated and claimed.

In the accompanying drawings: Figure 1 is a plan view of the automobile lifter of this invention showing the same in its lowered position. Fig. 2 is a side elevation of the same. Fig. 3 is a side elevation showing the body supporting frame raised. Fig. 4 is an end view showing the elevating frame in its final position.

In the preferred embodiment of this invention, I employ a substantially rectangular supporting base or frame 1 which, if desired, may be fastened to the floor of a garage.

In connection with the normally stationary supporting base frame 1, I employ a body elevating and supporting frame 2 which is also preferably rectangular in plan as shown, the same being pivotally mounted on the upper extremities of parallel motion links 3 the lower extremities of which are connected by pivots 4 to lugs 5 on the base frame 1. All of the links 4 are preferably of the same length. The frame 2 is provided adjacent to the rear end thereof with spring stops 6 having upturned end portions 7 against which the front axle of the automobile strikes just before the frame 2 starts its movement toward its supporting position. The spring stops 6 allow for a slight variation in the height of the front axle of the machine due to the size of the front tires and also to compensate for any variation in the degree of inflation of the front tires.

8 represents a hand lever which is connected by a pivot 9 to a bracket 10 on one of the end cross bars of the base frame 1. A stay rod 11 is pivotally connected at one end to the lever 8 and the opposite end portion thereof is slidable through an opening 12 in the opposite end cross bar of the vehicle elevating and supporting frame 2. Said end of the stay rod is threaded to receive a nut 13 by the adjustment of which the movement of the frame 2 under the thrust of the vehicle thereon may be limited so that the links 4 will not move too far beyond the vertical, the nut 13 being adjusted so as to allow said links to move past the vertical to prevent the return or collapsing movement of the frame 2. The lever 8 is formed with a shoulder 14 which when the lever is in a substantially upright position extends under the front cross bar of the frame 2 while the upper portion of said lever bears against the outer face of said end bar to limit the forward movement of the lever.

A rock shaft 15 extends transversely of and is journaled on the base frame 1. This shaft has fast on the opposite ends thereof generally wedge-shaped rocker blocks 16 which rest upon the ground or floor and over which the wheels of the automobile pass in mounting the lifter. These blocks are located on the outside of the frame 1 and have inclined faces 17 and rocker faces 18 enabling said blocks to turn as the rear wheels of the machine pass beyond the highest points of the blocks 16. This takes the weight of the tires off the blocks 16 after the vehicle has reached its final position. At the opposite or rear end of the frame there is another rock shaft 15′ corresponding with the shaft 15 and having blocks 16′ having inclined faces 17 and rocker faces 18. The shaft 4 at the rear end of the device extends entirely across the base frame and has the links 3 at that end of the frame fixedly connected thereto. It also has fixedly connected thereto a pair of stop levers 19 the free ends of which are formed with curved portions 20 which are adapted to bear against the longitudinal side bars of the vehicle supporting frame when the latter is in its elevated position in order to limit the movement of said links 3. The levers 19 are so proportioned as to permit the upper extremities of said links 3 to move slightly beyond a vertical line passing through the shaft 4 at that end of the device. Each of the levers 19 is provided with an actuating arm 21 the upper end of which lies in the path of the vehicle axle which is indicated by dotted lines at 22. When the vehicle axle comes in contact with the arms 21, the stop levers 19 are raised so that their free ends come in contact with the bottom faces of the side bars of the vehicle supporting frame thereby preventing further movement of the frame and the links 3 in the manner above stated and also removing the greater portion of the strain or tension on the stay rod 11.

The operation of the lifter may be described as follows: Starting with the lifter in its lowered position as shown in Fig. 2, the automobile is driven so that the front wheels will pass over the front blocks 16 and then upon the rear blocks 16, the rear wheels of the machine following and riding upwardly upon and over the front blocks 16. The momentum of the vehicle in a forward direction then causes the front axle to operate against the stop 6 and thrust the frame 2 farther in the same direction until it is stopped by the nut 13 and the stop lever 19. When this has taken place, the links 3 have passed beyond the vertical thereby preventing the return movement of the frame 2 and causing the load to be removed from the tires of the wheels which remain suspended. To demount the automobile, the lever 8 is moved in the reverse direction by hand until the links 4 have passed to the opposite side of the vertical whereupon the frame 2 will be pressed downwardly by the weight of the vehicle until the axles are clear of the frame 2 and the wheels are resting upon the blocks 16, the wheels rolling down the inclined initial portions of said blocks. The device as a whole is especially designed for use in garages, public or private, in order that the owner of the car may remove all weight from the tires of his machine when the latter is not in use.

I claim:—

1. In a lifter of the class described, the combination of a supporting base, a vehicle supporting frame connected thereto by parallel motion links and arranged to engage, elevate and support the front and rear axles of the vehicle, means engaged by the vehicle while in motion for actuating said vehicle supporting frame longitudinally, a stay rod having a slidable connection with one end of the last named frame, and a manually operable lever connected with said stay rod for shifting the body supporting frame in the opposite direction, said lever coöperating with the body supporting frame and the latter acting to limit the movement of the lever in one direction.

2. In a lifter of the class described, the combination of a supporting base, a vehicle elevating and supporting frame, parallel motion links connecting said frame with the supporting base, means for limiting the movement of said vehicle supporting frame in one direction, axle engaging stops on said frame, a rock shaft journaled on the base frame, and tilting blocks fast on said rock shaft and mounted in the path of the wheels, said blocks having upwardly inclined wheel elevating faces, and rocker faces adapting said blocks to be tilted when the wheels pass beyond the line of the rock shaft.

3. In a lifter of the class described, the combination of a supporting base, a vehicle elevating and supporting frame, parallel motion links connecting said frame and base, axle stops on said frame, a rock shaft extending transversely of the base frame, stop levers on said rock shaft adapted to bear against the vehicle supporting frame when the latter is elevated, and arms on said rock shaft adapted to be actuated by the vehicle axle for moving said stop levers into contact with the vehicle supporting frame to limit the movement of the links.

In testimony whereof I affix my signature.

WILLIAM J. TAYLOR.

Witnesses to signature:
R. V. CLARK,
WINNIE A. WATERS.

Copies of this patent may be obtained for five cents each, by addressing the "Commissioner of Patents, Washington, D C."